US011074740B2

(12) United States Patent
Roberts (10) Patent No.: US 11,074,740 B2
(45) Date of Patent: Jul. 27, 2021

(54) SHADER EDITING

(71) Applicant: Constructive Labs, Santa Cruz, CA (US)

(72) Inventor: Michael Roberts, Los Gatos, CA (US)

(73) Assignee: Constructive Labs, Santa Cruz, CA (US)

( * ) Notice: Subject to any disclaimer, the term of this patent is extended or adjusted under 35 U.S.C. 154(b) by 0 days.

(21) Appl. No.: 16/618,055

(22) PCT Filed: Jun. 1, 2018

(86) PCT No.: PCT/IB2018/053942
§ 371 (c)(1),
(2) Date: Nov. 27, 2019

(87) PCT Pub. No.: WO2018/220594
PCT Pub. Date: Dec. 6, 2018

(65) Prior Publication Data
US 2020/0105044 A1    Apr. 2, 2020

Related U.S. Application Data

(60) Provisional application No. 62/513,848, filed on Jun. 1, 2017.

(51) Int. Cl.
*G06T 15/60* (2006.01)
*G06T 15/00* (2011.01)

(52) U.S. Cl.
CPC .................. *G06T 15/005* (2013.01)

(58) Field of Classification Search
CPC ....... G06T 15/506; G06T 15/50; G06T 15/80; G06T 15/60; G06T 15/06

(Continued)

(56) References Cited

U.S. PATENT DOCUMENTS

2007/0018980 A1* 1/2007 Berteig ................. G06T 17/005
                                                                    345/426
2013/0063460 A1* 3/2013 Marison ................ G06T 15/005
                                                                    345/582

FOREIGN PATENT DOCUMENTS

WO    2013036462 A1    3/2013

OTHER PUBLICATIONS

Martin Fitger : "Visual Shader Programming", Jan. 1, 2008, pp. 1-93, Retrieved from the Internet:URL:http://kiosk.nada.kth.se/utbildning/grukth/exjobb/rapportlistor/2008/rapporter08/fitger_martin_08043.pdf [retrieved Dec. 4, 2019] p. 31, par. 1; fig. 5.3; p. 31-34, "5.3 User Interface", in particular p. 56-61, section "Chapter 7—The Resulting System", in particular p. 56, par.1; p. 28, par.1—p. 29; par. 1; fig. 5.1; fig. 5.2 p. 32, par. 4—p. 33, par. 2; fig. 5.3-5.5; p. 48, par. 1-3; p. 49, par. 4-6.

(Continued)

*Primary Examiner* — Gordon G Liu
(74) *Attorney, Agent, or Firm* — Shun Yao; Park, Vaughan, Fleming & Dowler LLP (57) ABSTRACT

A method and system for editing a shader. The method comprises providing a graph (122) corresponding to the shader (e.g. a shader graph). The graph (122) comprises a plurality of entities (120), for example shader nodes, which are connected together by one or more edges (124). One or more of the entities each include a respective variable parameter. The method further comprises sending, from an editor entity (130-136), to an entity (120) within the graph (122), a message, the message specifying a change in a value of the variable parameter of that entity (120); responsive to the entity (120) receiving the message, changing the variable parameter of that entity (120), thereby providing a changed graph; and modifying the shader based on the changed graph.

16 Claims, 2 Drawing Sheets

(58) Field of Classification Search
USPC .......................................................... 345/426
See application file for complete search history.

(56) References Cited

OTHER PUBLICATIONS

Xue Daqing et al.: "Indirect Shader Domain Rendering", Dec. 1, 2010, Medical Image Computing and Computer-Assisted Intervention—MICCAI 2015: 18th International Conference, Munich, Germany, Oct. 5-9, 2015; Proceedings; [Lecture Notes in Computer Science; Lect. Notes Computer], Springer International Publishing, CH, XP047441614, ISSN: 0302-9743 ISBN: 978-3-540-70543-7 p. 514, par. 3.
Gregory D Abram et al.: "Building block shaders", Computer Graphics, ACM, US, vol. 24, No. 4, Sep. 1, 1990, pp. 283-288, XP058098667, ISSN: 0097-8930, DOI: 10.1145/97880.97910 fig. 5, 6.

* cited by examiner

SHADER EDITING

FIELD OF THE INVENTION

The present invention relates to the construction, editing, and distribution of procedural shaders, for example, shaders for use on graphics processing units.

BACKGROUND

Procedural noise functions have widespread application in the field of computer graphics and can be used to generate or synthesize original content from procedural descriptions, as well as "amplify" artwork generated by users. For example, Perlin noise is a procedural texture primitive used to generate realistic visual appearances in computer graphics. Additionally, such noise functions can control the distribution of plant or grass models in a landscape, the visual appearance of clouds, or the distribution of pollen grains on a flower stamen.

In the field of computer graphics, procedural textures are typically defined using such procedural noise functions and a set of associated parameters, which are referred to herein as "parametrized noise functions". For networked computer graphics applications, this representation is far more compact than a corresponding artist-generated high-resolution texture bitmap, and thus can typically be transmitted far faster than the non-procedural version, incurring only the expense of evaluating the texture function on the receiving client computer.

With the advent of graphics processing unit (GPU) graphics cards, and also corresponding lower-performance mobile device accelerators, performing visual appearance computations using such noise function computations tends to be eminently practical. However, writing procedural noise functions and their associated shaders tends to be a complex operation, typically performed in two-dimensions (2D) with a conventional code editing program, or perhaps shader editing programs.

In computer graphics, a shader is a type of computer program. Shaders are typically used for shading purposes but may also be used to perform a variety of different functions in various fields. Shaders are typically written in a shading language such as the OpenGL Shading Language, which is often abbreviated to GLSL.

Shaders may use noise functions, for example in place of conventional texture samplers, for example to provide the texture for a surface point or to warp the vertices of a mesh according to a parameterized function. OpenGL uniforms, or similar mechanisms, can be used to provide the parameters for the noise functions, with the intent that such parameters can be modified, or animated, by control code running in the computer processing unit (CPU) side of a rendering engine. Similarly, other control values, such as constants, can be "compiled" into a noise function as part of a shader.

Complete shaders can be generated from "pieces" or "shader nodes" that can be combined together in different topologies. For example, "Shade Trees" for colouring pixels combine elements for ambient and specular terms with a colour to produce a final colour output. Pure noise functions can be combined in a very similar way for a variety of different visual appearance effects.

SUMMARY OF THE INVENTION

In a first aspect, the present invention provides a method for editing a shader. The method comprises providing a graph corresponding to the shader, the graph comprising a plurality of entities connected together by one or more edges, wherein one or more of the entities each include a respective variable parameter; sending, from an editor entity, to an entity within the graph, a message, the message specifying a change in a value of the variable parameter of that entity within the graph; responsive to the entity receiving the message, changing the variable parameter of that entity, thereby providing a changed graph; and modifying the shader based on the changed graph.

Changing the variable parameter of an entity may cause a change in a code fragment of that entity. The method may further comprise performing one or more times steps (i)-(ii) until a code fragment of a root entity within the graph is changed, thereby to provide the changed graph. Step (i) comprises, responsive to changing a code fragment of an entity, sending, in a further message, that changed code fragment from that entity to a different entity within the graph that is connected to that entity within the graph via an edge. Step (ii) comprises, responsive to an entity receiving a message, changing a code fragment of that entity based on the message received by that entity. The method may further comprise modifying the shader based on the changed graph.

In some aspects, the message may produce a call or calls to set uniform values (e.g. OpenGL uniforms), or similar functionality, onto the compiled shader. The message may result in the setting of shader uniforms in the shader or graph in the memory of a GPU. This may be performed instead of recompiling the shader.

The method may be performed by one or more processors.

One or more of the entities in the graph may comprise one or more of: a noise function, a shader function, a texture bitmap, a procedural texture generation network, a geometry file, or a height map.

The graph may be a directed graph. Step (ii) may comprise, responsive to changing a code fragment of an entity, sending, in a further message, the changed code fragment from that entity to an entity that is upstream from that entity within the graph.

The entities of the graph may be distributed across the respective memories of multiple different computer, the multiple different computers being communicatively coupled together. The entities of the graph may be stored in a memory of only a single computer.

Modifying the shader based on the changed graph may comprise compiling the graph to produce the edited shader. The method may further comprise, responsive to the root node receiving a changed code fragment, sending a representation (e.g. an intermediate representation) of the shader to a graphics processing unit. The compiling of the graph to produce the edited shader may be performed by the graphics processing unit using the representation of the shader. Alternatively, the shader may be compiled into a format that is executable by a graphics processing unit, and the method may further comprise sending the compiled shader to the graphics processing unit.

The method may further comprise selecting a plurality of editor objects; assembling together the plurality of editor objects in a virtual environment, thereby to construct the editor entity; and connecting, via an edge, the constructed editor entity to an entity in the graph. The constructed editor entity may be embedded in a frame.

The graph may be provided in a virtual environment on a user device. The editor entity may be provided in a virtual environment. The editor entity may be a 3D object within a 3D virtual environment. The virtual environment may be a shared environment between multiple different users operating respective user device, such that the shader graph is editable by each of the multiple users. The virtual environment may be a three-dimensional virtual environment which is manipulatable using a virtual reality controller.

The method may further comprise: providing a further graph, the further graph being substantially identical to the graph, wherein the further graph is located on a different computer to the computer on which the graph is located; sending the message to an entity within the further graph corresponding to the entity in the graph to which the message was sent; and replaying, within the further graph, the same message propagation and code fragment changing process that occurred in the graph.

The message may be a root cause message.

Changing a code fragment may comprise using a template engine. Each code fragment may comprise one or more of the following: machine-code executable by a GPU, textual code, a textual representation, GLSL code, a SPIR-V representation, and a parse tree.

The editor entity may send the message responsive to receiving a user input. The editor entity may be a programmatic object, which may be selected from the group of programmatic objects consisting of property editor widgets, handles, and textual code.

Each entity may be an entity selected from the group of entities consisting of: an actor, an entity, an object, an edge which is an object with a sender port and a receiver port, and a node with one or more ports, wherein the node can couple via edges to ports on other nodes, wherein the node is uniquely identified by a combination of an engine identifier and an instance identifier, and wherein a respective port can couple to one or more edges.

The method may further comprise executing the compiled shader on a graphics processing unit and recovering data from the executing shader into a buffer or data map.

The method may further comprise: executing the compiled shader on a graphics processing unit including rendering, by a rendering engine on graphics processing unit, a sequence of render frames; responsive to the root entity receiving a changed code fragment, sending a shader update message to the rendering engine; placing the shader update message in a message processing queue in the rendering engine; and processing, by the rendering engine, the contents of the message processing queue in-between the render frames.

Providing the graph may comprise: providing a repository comprising the plurality of entities; and constructing, by one or more users using one or more user devices, the graph by selecting the plurality of entities from the repository and connecting together the entities by edges.

One or more entities in the graph may correspond to a function. The variable parameters of entities may be variable function parameters.

In a further aspect, the present invention provides a method for updating or modifying a shader. The shader corresponds to a shader graph comprising a plurality of entities connected together by one or more edges, wherein one or more of the entities each include a respective variable parameter. The method comprises: sending, from an editor entity, to a first entity within the graph, a message, the message specifying a change in a value of the variable parameter of the first entity; responsive to the first entity receiving the message, changing the variable parameter of the first entity, wherein the changing the variable parameter of the first entity causes a change in a first code fragment of the first entity; sending, from the first entity, to a second entity within the graph via an edge connected between the first and second entities, the changed first code fragment; responsive to the second entity receiving the changed first code fragment, changing a second code fragment of the second entity based on the changed first code fragment; and, thereafter, updating the shader using the changed code fragments.

In a further aspect, the present invention provides a computer system for editing a shader. The computer system comprises one or more processors and one or more storage devices. The one or more storage device store: a graph corresponding to the shader, the graph comprising a plurality of entities connected together by one or more edges, wherein one or more of the entities each include a respective variable parameter, and wherein the graph comprises a root entity; an editor entity; and instructions that when executed by the one or more processors cause the one or more processors to perform a method. The method comprises: sending, from the editor entity, to an entity within the graph, a message, the message specifying a change in a value of the variable parameter of that entity within the graph; performing one or more times steps (i)-(ii) until the root entity receives a changed code fragment, thereby to provide a changed graph, wherein: step (i) comprises, responsive to an entity receiving a message, changing a code fragment of that entity based on the message received by that entity; and step (ii) comprises, responsive to changing a code fragment of an entity, sending, in a further message, the changed code fragment from that entity to a different entity within the graph that is connected to that entity within the graph via an edge; and, thereafter, modifying the shader based on the changed graph.

In a further aspect, the present invention provides a computer system for updating a shader. The shader corresponds to a shader graph comprising a plurality of entities connected together by one or more edges, wherein one or more of the entities each include a respective variable parameter. The computer system comprises one or more processors and one or more storage devices storing instructions that when executed by the one or more processors cause the one or more processors to perform a method. The method comprises: sending, from an editor entity, to a first entity within the graph, a message, the message specifying a change in a value of the variable parameter of the first entity; responsive to the first entity receiving the message, changing a first code fragment of the first entity based on the message; sending, from the first entity, to a second entity within the graph via an edge connected between the first and second entities, the changed first code fragment; responsive to the second entity receiving the changed first code fragment, changing a second code fragment of the second entity based on the changed first code fragment; and, thereafter, updating the shader using the changed code fragments.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a non-transitory computer-readable storage medium storing a program or at least one of the plurality of programs according to the preceding aspect.

The present inventors have realised that conventional completely procedural representations tend to suffer from problems such as a lack of mutability, limits on animation capabilities and picking. Methods and systems in accordance with the above aspects tend to overcome these deficiencies.

Moreover, methods and systems in accordance with the above aspects tend to allow for the development of both pure shading functions and noise functions by the combination of pre-made pieces (i.e. shader nodes), in conjunction with a polygonal geometry-based rendering engine. Methods and systems in accordance with the above aspects further tend to allow for end-user development of shaders, and for shading them between users as part of user-generated content, as well as for the display and amplification of conventional artwork. Similarly, networks of shaders nodes can be encoded for transmission in a computer network, providing a compact representation for sending from one computer to another a visual appearance or form.

Moreover, some implementers of computer graphics technology (such as technology using the WebGL specification) have gone to considerable lengths to prevent attacks on an end-user's browser system using malicious code included as shaders. Efforts have included locking down browsers, so that WebGL code can only be loaded onto the browser using verified connections. Methods and systems in accordance with the above aspects tends to provide improved security by precluding or avoiding the downloading of unverified shader code onto a user's system, e.g., by constructing shaders and procedural noise functions out of pre-built and approved components or shader nodes.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the scope of the present disclosure. Thus, the present invention is not limited to the embodiments shown but is to be accorded the widest scope consistent with the principles and features disclosed herein.

Figure 1:
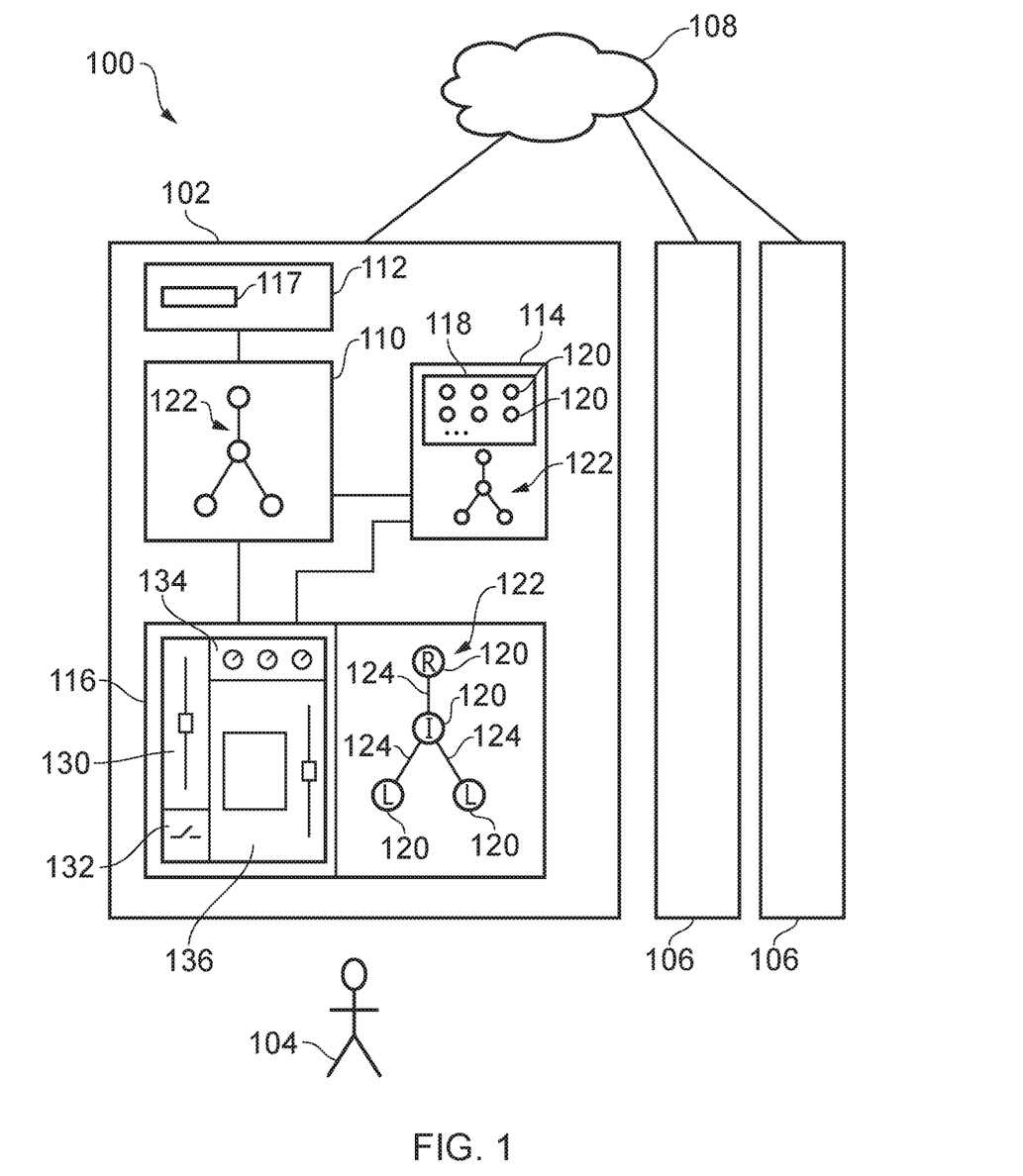
FIG. 1 is a schematic illustration (not to scale) of a system for constructing, compiling, and/or editing a shader.

FIG. 1 is a schematic illustration (not to scale) of an embodiment of a system 100 for constructing, compiling, and/or editing a shader.

In this embodiment, the system 100 comprises a first user device 102 operated by a user 104. The first user device 102 is communicatively coupled to a plurality of further user devices 106 via a network 108 such as the Internet.

The first user device 102 comprises a central processing unit (CPU) 110, a graphics processing unit (GPU) 112, a memory 114, and a user interface 116, which are communicatively coupled together.

In this embodiment, the GPU 112 comprises a graphics card 117.

In this embodiment, the memory 114 comprises a repository 118. The repository 118 stores a plurality of pre-defined shader objects 120 which are illustrated as circles in FIG. 1.

The user interface 116 comprises a display. For example, the user interface 116 may comprise a touchscreen.

Apparatus, including processors and memories, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM etc., or any combination of these or other storage media.

The construction and editing of a shader from the pre-defined shader objects 120 by the user 104 using the first user device 102 will now be described with reference to FIG. 2. This description of constructing and editing the shader will refer back to FIG. 1.

Figure 2:
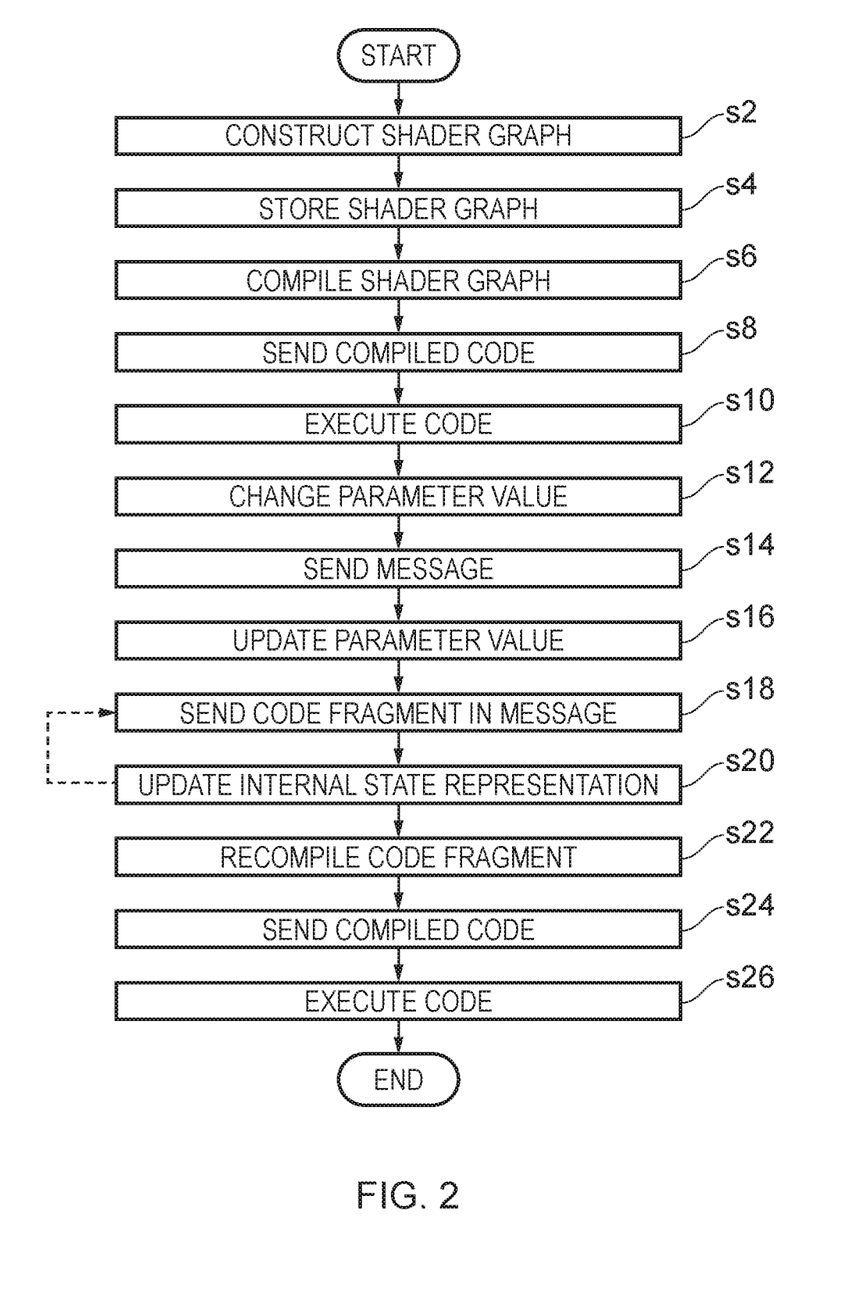
FIG. 2 is a process flow chart showing certain steps of a method implementable by the system.

FIG. 2 is a process flow chart showing certain steps of a method implementable by the system 100. The method includes construction and editing of a shader.

It should be noted that certain of the process steps depicted in the flowchart of FIG. 2 and described below may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

At step s2, the user 104 controls the user interface 116 to select a plurality of the shader objects 120 stored in the repository 118, and to connect these selected shader objects 120 together via edges to form a shader graph. The shader graph is shown in FIG. 1 displayed on the user interface 116 and is indicated by the reference numeral 122. Edges of the shader graph 122 are indicated in FIG. 1 by the reference numeral 124. In some embodiments, the shader graph 122 is acyclic. In some embodiments, the shader graph 122 is a tree.

In this embodiment, the shader graph 122 is representative of a shader.

In this embodiment, each of the shader objects 120 comprises or is configured to implement a respective shader or procedural noise function.

In this embodiment, the connecting together of the shader objects 120 is implemented with a virtual environment, which may be a 3D virtual environment.

In this embodiment, the shader objects 120 are entities or objects as described in International Application No.: PCT/US2017/060430, Publication No.: WO/2018/085851, "SYSTEM AND METHOD FOR FACILITATING SHARING OF VIRTUAL THREE-DIMENSIONAL SPACE", the entirety of which is incorporated herein by reference. Also, the connecting together of the shader objects 120 is implemented as described in International Application No.: PCT/US2017/060430. Thus, the shader objects 120 within the virtual environment may be fully functional "nodes" or "actors", which are connected to other objects via edges. In use, as described in more detail later below, messages can be sent between nodes, for example, to update their internal states. Such message passing may be performed as described in International Application No.: PCT/US2017/060430. The system 100 contains object engines containing nodes having the properties of actors. These nodes can receive messages and respond to each such message it receives by changing internal state, generating one or more new messages, or creating one or more new nodes also having actor properties.

The person skilled in the art will appreciate that the term "entity" may be used to refer to any software construct which can be conceptually considered as forming a single item of some sort, whilst the term "object" is used with its normal meaning as well known to persons familiar with object-oriented paradigms of computer software (e.g. one can instantiate an instance of an object based on its associated object class, etc.). The term "actor" may be used to refer to an element of a computer program built in accordance with the Actor Model of concurrent computing, which implies that it is an entity which communicates with other actor entities by sending messages and receiving messages and responding to those received messages by changing state and/or by sending messages itself. In general, unless it is apparent from the context that such is not the case, most entities in the present embodiment (e.g. nodes) are objects (in the sense that they are instantiations of an associated object class) which also behave as actors (in that they send and receive messages, etc.) and thus a node may, for example, properly be referred to as either an object or an actor depending upon what properties of the node are most relevant to the context in which the term is used. Nodes can be connected to other nodes via "edges", which may also be considered to be actors in that they may send and receive messages, etc.

In this embodiment, the shader graph 122 comprises objects 120 that provide a root node (indicated by the reference symbol "R" in FIG. 1) and a plurality of leaf nodes (indicated by the reference symbol "L" in FIG. 1). The shader graph 122 additionally comprises an object 120 corresponding to an intermediate node (indicated by the reference symbol "I" in FIG. 1) connected between the root node R and the leaf nodes L.

The leaf nodes L correspond to parameterized functions, for example parameterized noise functions, with zero or more parameters. Examples of such parameterized functions include, but are not limited to, a sine ("sin") function, a cosine ("cos") function, a Perlin noise function, and other coherent noise functions, lattices or value-gradient noises, etc. Similarly, a procedural shader might use functions relating an input value consisting of a light position and intensity to reflected light falling on a surface, or other similar functions.

Intermediate nodes I between the leaf nodes L and root nodes R may provide, for example, parameterized combination functions with zero or more variable parameters. Examples of such combination functions include, but are not limited to, a "mix" function, a "ceil" function, an "atan" function, an "add" function, a multiplication function, or an averaging function. Other examples include interpolation functions, scaling functions, and selection functions, for example selection functions in which one or more values control the "mix" or ratio between other values.

The parameters of the parameterized functions may be either variables (for example "Uniform Variables" or "Uniforms" as used in OpenGL and GLSL) or constants.

At step s4, the constructed shader graph 122 may be stored in the memory.

At step s6, the CPU 110 may access and process the shader graph 122 stored in the memory 114, as represented schematically in FIG. 1 by the shader graph 122 located within the box representing the CPU 110. In particular, in this embodiment, the CPU 110 compiles the shader graph 122 representation of the shader into machine-code, or another format, that is executable by the GPU 112. This machine-code, or another format, that is executable by the GPU 112 may be referred to as "a shader". In OpenGL, such a shader can be compiled by the driver from the generated textual representation. In other systems, access to a shader compiler may be used to compile the shader into an intermediate representation such as SPIR-V, or directly to the machine code used in the graphics rendering device. Those skilled in the art will realize that this process can be performed by combining chunks of an intermediate representation (such as SPIR-V) assisted by an intermediate representation (such as a tree). In some implementations, the shader compilation process is handled via a ShaderManager object.

At step s8, the CPU 110 may send the compiled machine-code to the GPU 112. In other words, the compiled shader is uploaded to the GPU 112.

At step s10, the GPU 110 executes the received machine-code and may generate, using the graphics card 117, a feed of output images for display (e.g. on a display device on the first user device 102) to the user 104.

Steps s12 to s26 of FIG. 2 describe the editing, updating, changing, or modification of the shader by the user 104, and thereby the altering of the output of the GPU 110 (i.e. the stream of images displayed to the user 104).

At step s12, the user 104 operates the user interface 116 to select a new value of one or more parameters of one or more of the objects 120 (or nodes) in the shader graph 122.

More specifically, in this embodiment, the user interface 116 comprises a plurality of editor entities, which may include, for example, one or more sliders 130, one or more switches 132, one or more dials 134, and one or more colour pickers 136. The editor entities 130-136 are entities or objects as described in International Application No.: PCT/US2017/060430. The editor entities 130-136 may be programmatic objects. For example, the editor entities 130-136 may include property editor widgets, handles, and textual code.

Each editor entity 130-136 corresponds to a parameter of an object 120 in the shader graph 122. The editor entities 130-136 are operable to vary the values of the corresponding parameters.

By way of example, the user 104 controls one of the editor entities 130-136 to vary the value of an associated parameter of a leaf node L of the shader graph 122. For example, the user may move a slider 130 or turn a dial 132 to change a value of an associated parameter of a parametric function of the leaf node L.

In some embodiments, an editor entity 130-136 may be a property editor widget (e.g. a 3D widget) composed of a number of manipulator components, which may be combined by a frame. An editor entity 130-136 may be automatically generated by the system based on the properties (e.g. the uniforms and/or constants) of a corresponding object 120, or may be "authored" by someone working on the definition for the object, for example, by assembling a plurality of such editing entities.

In other words, advantageously, an editor entity 130-136 may be constructed (e.g. by one or more users 104 using one or more user devices 106) by selecting multiple objects and assembling together those objects in the virtual environment, thereby to construct an editor object. The multiple objects may be selected from the repository 118. The constructed editor object may be connected to a shader node 120 in the shader graph 122 by an edge 124.

An editor entity 130-136 may combine code editing, setting of values (such as colours) into constants, and setting of "default" values for uniforms, which would normally be set by objects using the shader during the rendering process.

The editor entities 130-136 (which may be regarded as manipulators for the object properties) may be embedded in a frame to form a composite 3D object that can be moved within the virtual environment by the user 104, e.g. as a whole, to a convenient location in their visual field. Other sorts of editor entities or editor widgets, such as 3D editors, e.g. curve editors, could be used.

At step s14, the editor entity 130-136 controlled by the user 104 sends a message to its corresponding object 120 in the shader graph 122. Thus, in this example, the changed editor entity 130-136 sends a message to the leaf node L. The message and the sending of the message may be as described in International Application No.: PCT/US2017/060430. In this embodiment, the message sent from the editor entity 130-136 to its corresponding object 120 specifies the changed parameter value.

At step s16, responsive to receiving the message, the object 120 (i.e. the leaf node L in this example) that receives the message changes the value of its parameter(s) in accordance with the received message. Such an operation may happen in the memory of the host computer.

In this embodiment, the object 120 (i.e. the shader node) that receives the message can elect to "recompile" its textual representation to incorporate the changed value. For example, the object 120 may substitute the constant value for the constant value defined in the message (which may be considered to be a code fragment). Those skilled in the art will recognize that this process could also be performed in an intermediate representation such as a parse tree or byte code representation.

Thus, in this embodiment, changing the value of its parameter(s) in accordance with the received message results in the object generating a code fragment that incorporates the changed value. A code fragment may be a piece of code. A code fragment may be a unit for executable code.

A code fragment may be, for example, code compiled into machine-code that is executable by the GPU 112, textual code (i.e. a textual representation), an intermediate representation, a parse tree, a SPIR-V representation, etc.

In some implementations, rather than recompile the shader, the message produces a call or calls to set OpenGL uniforms, or similar functionality, onto compiled OpenGL (or similar) shaders. The message may result in the setting of shader uniforms in the shader graph 122 in the memory of the GPU 112.

At step s18, the object 120 that received the message (i.e. the leaf node L in this example) then sends the compiled code representation to its upstream node, towards the root node R of the shader network, via message, as identified by the edges connecting the objects in the shader graph 122.

In other words, in response to changing the value of its parameter(s) in accordance with the received message and generating a corresponding code fragment, the object 120*b* sends that code fragment to its upstream node in the shader graph. Thus, in this example, the leaf node L sends a created code fragment in a message to the intermediate node I.

At step s20, upon reception of the compiled code in the message (i.e. responsive to receiving the code fragment from the leaf node L), the intermediate node I substitutes that code into its own internal representation. The intermediate node I generates a new intermediate representation (i.e. a new code fragment) and send this to its upstream node. As indicated in FIG. 2 by a dotted arrow between blocks s20 and s18, this process continues until the process terminates at the root shader node R, which has no upstream representation to send code to, and where in this example the final "compiled" shader lands.

In other words, the following process steps (i) and (ii) are performed in order until the root node R receives a code fragment from its downstream node and updates its intermediate representation:

- step (i) comprises, responsive to an object 120 in the shader graph 122 generating a new code fragment, sending from that object 120 to an upstream object 120 within the shader graph 122 that is connected to that object 120 via an edge 124, in a message, that new code fragment; and
- step (ii) comprises, responsive to an object 120 in the shader graph 122 receiving a message including a new code fragment, updating, by that object 120, its internal state to incorporate the new code fragment and also generating a further new fragment based on its updated internal state.

Code fragments transmitted to nodes (e.g. intermediate nodes I) may be cached, for example, in order to assure rapid and order-free compilation.

At step s22, the root node object R operating on the CPU 110 processes the code fragment it receives. The received code fragment may be compiled into GLSL, SPIR-V, machine-code, or another format representing the shader in a format that is acceptable to the GPU 112. In other words, the root node R may compile the representation of the changed function into a "GPU compatible" compiled shader. This code may be further compiled and/or uploaded to the GPU 112 with the result that the noise function or shader program becomes executable by the GPU 112.

At step s24, the CPU 110 sends the compiled machine-code generated at step s22 to the GPU 112.

Typically, the compilation and upload steps (s22 and s24) include a "Shader Manager" object receiving compiled code from the root node R, optionally recompiling it, and finally uploading it to the GPU 112 e.g. via the appropriate graphics API call, such as some of the functions provided for the purpose in OpenGL, Vulkan, DirectX or similar.

At step s26, the GPU 110 executes the received machine-code and generates, using the graphics card 117, a feed of output images for display (e.g. on a display device on the first user device 102) to the user 104. These newly displayed images incorporate the new values of the one or more parameters altered by the user at step s12.

Executing the compiled shader on the GPU 112 may include rendering, by a rendering engine, a sequence of frames. The receiving and processing of code fragment by the root node R may comprise placing corresponding messages in a message processing queue inside the rendering engine. The contents of this queue may be processed in-between render frames by the native code running the render loop. Advantageously, this tends to incur a relatively small computational cost, for example because queue-processing can occur while the GPU 112 is rendering the current frame and after all state has been committed to the card 117.

Thus, a method that may be performed by the system 100 is provided.

Each shader may be associated a unique identifier or name. Graphics objects may use these identifiers or names to refer to the shader. Conceptually, shader graphs may live "inside" a ShaderContainer node. A ShaderManager object can supply an OpenGL handle to the compiled shader to any object which asks for such by name. In a typical multi-pass configuration, any object may be drawn by several named shaders in separate passes. In the OpenGL case, such a handle can be selected in the draw code for an object by calling glUseProgram (handle). The graphics object can then issue a series of glUniform calls to set uniforms on the shader, and other setup calls for geometry processing as needed, either individually, or via the selection of (for example) a VertexArrayObject (VAO). Data for the uniforms can come from a property editor open either on the shader network, or on the object being drawn, or directly from the shader nodes.

In the case where the shader graph is rendering to an intermediate representation, such as a height map, texture map, or other buffer object, the "output" of the root node of the shader network can be connected to the "input" of a render target object. The render target may have specific properties, which may be alterable by one or more editor entities (e.g. property editor widgets), which control the output format of the buffer. Such an object will setup a series of (for example) OpenGL state manipulation calls in order to perform the rendering operations and (optionally) recover the output buffer to the CPU. Such calls can be used, with further wiring, to redirect the output texture, for example, as the input to a further rendering operation.

Advantageously, the above described system and method allows for users to select "shader" and "noise" objects from a tool palette and place them inside a virtual environment. Users can manipulate these objects, e.g. using a VR controller. The objects can be "wired together" (using edges) using context specific menus to form shader graphs.

The above described system and method tends to provide improved security in that the downloading of unverified shader code onto a user's system tends to be reduced or eliminated. Shaders and procedural noise functions are constructed using pre-built and approved components.

The above described system and method tends to enable an increase in the visual complexity of renderable scenes.

Advantageously, the action of the shader formed from the connection of the objects together, and the setting of their parameters, can be directly observed by users inside the virtual environment, on objects inside the environment.

Advantageously, the process of compiling the shader from the shader graph may be handled in a distributed manner, i.e. across multiple different processors or devices.

Advantageously, the shader graph editing functionality tends to be shared and multi-user. Thus, multiple users can collaborate together on shader development within the same virtual space, with no requirement for the users to be physically co-located in the same physical space. This tends to be at least facilitated by the messaging system and processes implemented by the above described system, further information about which may found in International Application No.: PCT/US2017/060430, the contents of which are included herein by reference.

The system tends to allow for the recovery of data from operating shaders into buffers or data ("bitmaps", "heightmaps", etc.). Thus, it tends to be possible to connect shaders together at the meta-level, with the shaders producing and consuming data through CPU-based objects, or directly using buffers inside the GPU. Such objects can be transmitted across the network, so that a network of communicating shader objects can extend across different physical GPU resources, and even across networks of instances.

Advantageously, the above described system allows for simple object creation. It tends to be relatively easy for user to create and upload to the repository, shader objects, e.g. for use by other users. Such user created shader object may be validated for security purposes prior to their inclusion in the repository.

Messages send by the editor entities (e.g. manipulator widgets) can, in the case of a network connected system, flow across the network to another user's computer or mobile device, affecting an object there in parallel with the manipulations being performed on the local computer. In this way, multiple users can simultaneously work on the same shader network.

In the above embodiments, the system is as shown schematically in FIG. 1. However, in other embodiments, the system may be different to that shown in FIG. 1.

In the above embodiments, the virtual space is a 3D virtual space. However, in other embodiments, the virtual space is a different type of virtual space, e.g. a 2D virtual space.

Clause 1. A method for editing a shader, the method comprising:
providing a graph corresponding to the shader, the graph comprising a plurality of entities connected together by one or more edges, wherein one or more of the entities each include a respective variable parameter, and wherein the graph comprises a root entity;
sending, from an editor entity, to an entity within the graph, a message, the message specifying a change in a value of the variable parameter of that entity within the graph;
responsive to the entity receiving the message, changing the variable parameter of that entity, wherein the changing the variable parameter of that entity causes a change in a code fragment of that entity;
performing one or more times steps (i)-(ii) until a code fragment of the root entity is changed, thereby to provide a changed graph, wherein:
step (i) comprises, responsive to changing a code fragment of an entity, sending, in a further message, that changed code fragment from that entity to a different entity within the graph that is connected to that entity within the graph via an edge; and
step (ii) comprises, responsive to an entity receiving a message, changing a code fragment of that entity based on the message received by that entity; and, thereafter, modifying the shader based on the changed graph.

Clause 2. The method of clause 1, wherein one or more of the entities in the graph comprise one or more of: a noise function, a shader function, a texture bitmap, a procedural texture generation network, a geometry file, or a height map.

Clause 3. The method of clauses 1 or 2, wherein:
the graph is a directed graph; and
step (ii) comprises, responsive to changing a code fragment of an entity, sending, in a further message, the changed code fragment from that entity to an entity that is upstream from that entity within the graph.

Clause 4. The method of any of clauses 1 to 3, wherein the entities of the graph are distributed across the respective memories of multiple different computer, the multiple different computers being communicatively coupled together.

Clause 5. The method of any of clauses 1 to 3, wherein the entities of the graph are stored in a memory of only a single computer.

Clause 6. The method of any of clauses 1 to 5, wherein modifying the shader based on the changed graph comprises compiling the graph to produce the edited shader.

Clause 7. The method of clause 6, wherein:
the method further comprises, responsive to the root node receiving a changed code fragment, sending a representation of the shader to a graphics processing unit; and
the compiling the graph to produce the edited shader is performed by the graphics processing unit using the representation of the shader.

Clause 8. The method of clause 6, wherein:
the shader is compiled into a format that is executable by a graphics processing unit; and
the method further comprises sending the compiled shader to the graphics processing unit.

Clause 9. The method of any of clauses 1 to 8, the method further comprising:
selecting a plurality of editor objects;
assembling together the plurality of editor objects in a virtual environment, thereby to construct the editor entity; and
connecting, via an edge, the constructed editor entity to an entity in the graph.

Clause 10. The method of clause 9, further comprising embedding the constructed editor entity in a frame.

Clause 11. The method of any of clauses 1 to 10, wherein the graph is provided in a virtual environment on a user device.

Clause 12. The method of any of clauses 1 to 11, wherein the editor entity is provided in a virtual environment.

Clause 13. The method of clause 12, wherein the editor entity is a 3D object within a 3D virtual environment.

Clause 14. The method of any of clauses 11 to 13, wherein the virtual environment is a shared environment between multiple different users operating respective user device, such that the shader graph is editable by each of the multiple users.

Clause 15. The method of any of clauses 1 to 14, wherein the virtual environment is a three-dimensional virtual environment which is manipulatable using a virtual reality controller.

Clause 16. The method of any of clauses 1 to 15, further comprising:
providing a further graph, the further graph being substantially identical to the graph, wherein the further graph is located on a different computer to the computer on which the graph is located;
sending the message to an entity within the further graph corresponding to the entity in the graph to which the message was sent; and
replaying, within the further graph, the same message propagation and code fragment changing process that occurred in the graph.

Clause 17. The method of any of clauses 1 to 16, wherein the message is a root cause message.

Clause 18. The method of any of clauses 1 to 17, wherein changing a code fragment comprises using a template engine.

Clause 19. The method of any of clauses 1 to 18, wherein each code fragment comprises one or more of the following: machine-code executable by a GPU, textual code, a textual representation, GLSL code, a SPIR-V representation, and a parse tree.

Clause 20. The method of any of clauses 1 to 19, wherein the editor entity sends the message responsive to receiving a user input.

Clause 21. The method of any of clauses 1 to 20, wherein the editor entity is a programmatic object selected from the group of programmatic objects consisting of property editor widgets, handles, and textual code.

Clause 22. The method of any of clauses 1 to 21, wherein each entity is an entity selected from the group of entities consisting of: an actor, an entity, an object, an edge which is an object with a sender port and a receiver port, and a node with one or more ports, wherein the node can couple via edges to ports on other nodes, wherein the node is uniquely identified by a combination of an engine identifier and an instance identifier, and wherein a respective port can couple to one or more edges.

Clause 23. The method of any of clauses 1 to 22, further comprising executing the compiled shader on a graphics processing unit and recovering data from the executing shader into a buffer or data map.

Clause 24. The method of any of clauses 1 to 23, further comprising:
executing the compiled shader on a graphics processing unit including rendering, by a rendering engine on graphics processing unit, a sequence of render frames;
responsive to the root entity receiving a changed code fragment, sending a shader update message to the rendering engine;
placing the shader update message in a message processing queue in the rendering engine; and
processing, by the rendering engine, the contents of the message processing queue in-between the render frames.

Clause 25. The method of any of clauses 1 to 24, wherein providing the graph comprises:
providing a repository comprising the plurality of entities; and
constructing, by one or more users using one or more user devices, the graph by selecting the plurality of entities from the repository and connecting together the entities by edges.

Clause 26. The method of any of clauses 1 to 25, wherein one or more entities in the graph correspond to a function, and the variable parameters of entities are variable function parameters.

Clause 27. A method for updating a shader, the shader corresponding to a shader graph comprising a plurality of entities connected together by one or more edges, wherein one or more of the entities each include a respective variable parameter, the method comprising:
sending, from an editor entity, to a first entity within the graph, a message, the message specifying a change in a value of the variable parameter of the first entity;
responsive to the first entity receiving the message, changing the variable parameter of the first entity, wherein the changing the variable parameter of the first entity causes a change in a first code fragment of the first entity;
sending, from the first entity, to a second entity within the graph via an edge connected between the first and second entities, the changed first code fragment; and
responsive to the second entity receiving the changed first code fragment, changing a second code fragment of the second entity based on the changed first code fragment; and,
thereafter, updating the shader using the changed code fragments.

Clause 28. A computer system for editing a shader, the computer system comprising:
one or more processors; and
one or more storage devices storing:
a graph corresponding to the shader, the graph comprising a plurality of entities connected together by one or more edges, wherein one or more of the entities each include a respective variable parameter, and wherein the graph comprises a root entity;
an editor entity; and
instructions that when executed by the one or more processors cause the one or more processors to perform a method, the method comprising:
sending, from the editor entity, to an entity within the graph, a message, the message specifying a change in a value of the variable parameter of that entity within the graph;

performing one or more times steps (i)-(ii) until the root entity receives a changed code fragment, thereby to provide a changed graph, wherein:
step (i) comprises, responsive to an entity receiving a message, changing a code fragment of that entity based on the message received by that entity; and
step (ii) comprises, responsive to changing a code fragment of an entity, sending, in a further message, the changed code fragment from that entity to a different entity within the graph that is connected to that entity within the graph via an edge; and, thereafter, modifying the shader based on the changed graph.

Clause 29. A computer system for updating a shader, the shader corresponding to a shader graph comprising a plurality of entities connected together by one or more edges, wherein one or more of the entities each include a respective variable parameter, the computer system comprising:
one or more processors; and
one or more storage devices storing instructions that when executed by the one or more processors cause the one or more processors to perform a method, the method comprising:
sending, from an editor entity, to a first entity within the graph, a message, the message specifying a change in a value of the variable parameter of the first entity;
responsive to the first entity receiving the message, changing a first code fragment of the first entity based on the message;
sending, from the first entity, to a second entity within the graph via an edge connected between the first and second entities, the changed first code fragment;
responsive to the second entity receiving the changed first code fragment, changing a second code fragment of the second entity based on the changed first code fragment; and, thereafter, updating the shader using the changed code fragments.

Clause 30. A program or plurality of programs arranged such that when executed by a computer system or one or more processors it/they cause the computer system or the one or more processors to operate in accordance with the method of any of clauses 1 to 27.

Clause 31. A non-transitory computer-readable storage medium storing a program or at least one of the plurality of programs according to clause 30.

The invention claimed is:

1. A method for editing a shader, the method comprising:
providing a graph corresponding to the shader, the graph comprising a plurality of entities connected together by one or more edges, wherein one or more of the entities each include a respective variable parameter, and wherein the graph comprises a root entity;
sending, from an editor entity, to an entity within the graph, a message, the message specifying a change in a value of the variable parameter of the entity within the graph;
responsive to the entity receiving the message, changing the variable parameter of the entity, wherein changing the variable parameter of the entity causes a change in a code fragment of the entity;
performing one or more times steps (i)-(ii) until a code fragment of the root entity is changed, thereby to provide a changed graph, wherein:
step (i) comprises, responsive to changing a code fragment of the entity, sending, in a further message, the changed code fragment from the entity to an upstream entity within the graph that is connected to the entity within the graph via an edge, wherein the upstream entity is located on a path between the entity and the root entity in the graph; and
step (ii) comprises, responsive to the upstream entity receiving the further message, changing a code fragment of the upstream entity based on the further message received by the upstream entity; and,
thereafter, modifying the shader based on the changed graph.

2. The method of claim 1, wherein one or more of the entities in the graph comprise one or more of: a noise function, a shader function, a texture bitmap, a procedural texture generation network, a geometry file, or a height map.

3. The method of claim 1, wherein the entities of the graph are distributed across the respective memories of multiple different computers, the multiple different computers being communicatively coupled together.

4. The method of claim 1, wherein modifying the shader based on the changed graph comprises compiling the graph to produce the edited shader.

5. The method of claim 4, wherein:
the method further comprises, responsive to the root node receiving a changed code fragment, sending a representation of the shader to a graphics processing unit; and
the compiling the graph to produce the edited shader is performed by the graphics processing unit using the representation of the shader.

6. The method of claim 4, wherein:
the shader is compiled into a format that is executable by a graphics processing unit; and
the method further comprises sending the compiled shader to the graphics processing unit.

7. The method of claim 4, further comprising:
executing the compiled shader on a graphics processing unit including rendering, by a rendering engine on the graphics processing unit, a sequence of render frames;
responsive to the root entity receiving a changed code fragment, sending a shader update message to the rendering engine;
placing the shader update message in a message processing queue in the rendering engine; and
processing, by the rendering engine, contents of the message processing queue in-between the render frames.

8. The method of claim 1, further comprising:
selecting a plurality of editor objects;
assembling together the plurality of editor objects in a virtual environment, thereby to construct the editor entity; and
connecting, via an edge, the constructed editor entity to an entity in the graph.

9. The method of claim 1, wherein the graph is provided in a virtual environment.

10. The method of claim 9, wherein the virtual environment is a shared environment between multiple different users operating respective user devices, such that the shader graph is editable by each of the multiple users.

11. The method of claim 1, wherein the editor entity is provided in a virtual environment.

12. The method of claim 1, further comprising:
providing a further graph, the further graph being substantially identical to the graph, wherein the further graph is located on a different computer to the computer on which the graph is located;
sending the message to an entity within the further graph corresponding to the entity in the graph to which the message was sent; and replaying, within the further graph, the same message propagation and code fragment changing process that occurred in the graph, wherein the message is a root cause message.

13. The method of claim 1, wherein the editor entity is a programmatic object selected from the group of programmatic objects consisting of property editor widgets, handles, and textual code.

14. The method of claim 13, wherein each entity is an entity selected from the group of entities consisting of: an actor, an entity, an object, an edge which is an object with a sender port and a receiver port, and a node with one or more ports, wherein the node can couple via edges to ports on other nodes, wherein the node is uniquely identified by a combination of an engine identifier and an instance identifier, and wherein a respective port can couple to one or more edges.

15. A computer system for editing a shader, the computer system comprising:

one or more processors; and one or more storage devices storing:

a graph corresponding to the shader, the graph comprising a plurality of entities connected together by one or more edges, wherein one or more of the entities each include a respective variable parameter, and wherein the graph comprises a root entity;

an editor entity; and instructions that when executed by the one or more processors cause the one or more processors to perform a method, the method comprising:

sending, from the editor entity, to an entity within the graph, a message, the message specifying a change in a value of the variable parameter of the entity within the graph;

performing one or more times steps (i)-(ii) until the root entity receives a changed code fragment, thereby to provide a changed graph, wherein:

step (i) comprises, responsive to the entity receiving a message, changing a code fragment of the entity based on the message received by the entity; and step (ii) comprises, responsive to changing a code fragment of the entity, sending, in a further message, the changed code fragment from the entity to an upstream entity within the graph that is connected to the entity within the graph via an edge, wherein the upstream entity is located on a path between the entity and the root entity in the graph; and, thereafter, modifying the shader based on the changed graph.

16. A non-transitory computer-readable storage medium storing a program or at least one of a plurality of programs arranged such that when executed by a computer system or one or more processors it/they cause the computer system or the one or more processors to perform a method, the method comprising:

providing a graph corresponding to the shader, the graph comprising a plurality of entities connected together by one or more edges, wherein one or more of the entities each include a respective variable parameter, and wherein the graph comprises a root entity;

sending, from an editor entity, to an entity within the graph, a message, the message specifying a change in a value of the variable parameter of the entity within the graph;

responsive to the entity receiving the message, changing the variable parameter of the entity, wherein changing the variable parameter of the entity causes a change in a code fragment of the entity;

performing one or more times steps (i)-(ii) until a code fragment of the root entity is changed, thereby to provide a changed graph, wherein:

step (i) comprises, responsive to changing a code fragment of the entity, sending, in a further message, the changed code fragment from the entity to an upstream entity within the graph that is connected to the entity within the graph via an edge, wherein the upstream entity is located on a path between the entity and the root entity in the graph; and step (ii) comprises, responsive to the upstream entity receiving the further message, changing a code fragment of the upstream entity based on the further message received by the upstream entity; and, thereafter, modifying the shader based on the changed graph.

* * * * *